US006483174B1

United States Patent
Crafts et al.

(12) United States Patent
(10) Patent No.: US 6,483,174 B1
(45) Date of Patent: Nov. 19, 2002

(54) APPARATUS AND METHOD FOR DICING AND TESTING OPTICAL DEVICES, INCLUDING THIN FILM FILTERS

(75) Inventors: Douglas E. Crafts, San Jose, CA (US); Mark Moravec, Gilroy, CA (US); Scott Pallady, Canyon Country, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/931,282

(22) Filed: Aug. 16, 2001

(51) Int. Cl.[7] ............................................... H01L 39/00
(52) U.S. Cl. ......................................... 257/662; 438/69
(58) Field of Search ............................. 257/622; 438/14, 438/460, 113, 464; 452/387

(56) References Cited

U.S. PATENT DOCUMENTS

| | | | | |
|---|---|---|---|---|
| 5,668,033 A | * | 9/1997 | Ohara | 438/113 |
| 5,888,883 A | * | 3/1999 | Sasaki | 438/460 |
| 5,925,924 A | * | 7/1999 | Cronin | 257/622 |
| 6,184,109 B1 | * | 2/2001 | Sasaki | 438/464 |
| 6,261,165 B1 | * | 7/2001 | Lackey | 451/387 |

OTHER PUBLICATIONS

IEEE Transactions on applied superconductivity, vol. 11, No. 1 Mar. 2001. "Precision Technigues for Whole Eafer Dicing and Thinning of Superconducting Mixier Circuits." William L. Bishop pp. 71 through 74.*

* cited by examiner

Primary Examiner—John F. Niebling
Assistant Examiner—Andre' C Stevenson
(74) Attorney, Agent, or Firm—Jeff Klembczyk

(57) ABSTRACT

A technique for fabricating a plurality of thin film filters ("TFFs"), and other optical devices, from a wafer. A device or TFF wafer is affixed to a carrier having a pattern of notches formed thereon corresponding to a pattern into which the wafer is to be diced to form the TFFs. The notches are sized to allow clearance of a dicing apparatus. The wafer is diced at least partially into the notches to form the TFFs, and the TFFs may be individually optically tested with a light source aligned thereto, while they remain affixed to the carrier. The TFFs are removed from the carrier for operation, and the carrier can be re-used. To facilitate re-use, a releasable adhesive is applied to the wafer and/or the carrier, and the notches receive any excess adhesive when the wafer is being affixed to the carrier.

8 Claims, 6 Drawing Sheets

APPARATUS AND METHOD FOR DICING AND TESTING OPTICAL DEVICES, INCLUDING THIN FILM FILTERS

FIELD OF THE INVENTION

The present invention relates to optical thin film filters, and other optical devices requiring aligned dicing and subsequent optical test. More particularly, the present invention relates to dicing a device wafer while affixed to a pre-scribed carrier, and moving the carrier/diced filter assembly through dicing and test fixtures to maintain the positional accuracy of the individual diced devices during dicing and test.

BACKGROUND OF THE INVENTION

Thin film filters ("TFFs") are manufactured by depositing many, possibly hundreds of layers or films of varying thickness onto a glass substrate. The thickness, refractive index, number and sequence of the layers determine the effect of the filter on incident light, applied in a direction normal to the filter layers. High-pass, low-pass, band-pass and other filter types can be realized.

TFFs are conventionally fabricated using wafer-processing techniques. Each filter may have a planar dimension of 1–2 mm on a side, resulting in thousands of filters on, for example, a 6 inch wafer. Among the difficult issues confronted during fabrication are dicing the wafers post-deposition into individual TFF dies, and then optically testing each die. In its ultimate position in a functioning system, the alignment of a TFF is carefully controlled to be both axially aligned with, and perpendicular to, the incident light source. A similar positioning accuracy must also be attained during post-fabrication optical testing of the TFFs, to ensure their accurate optical characterization.

Other optical devices, such as diffractive optics, micro-lens arrays (small, monolithic, lithographically fabricated lenses), or diffraction grating arrays have similar alignment and test problems.

Currently, the fabrication and test process involves mounting the finished wafer onto a smooth, planar plate; dicing through the wafer and partially into the plate according to a dicing pattern resulting in many individual die; removing the individual TFF die from the plate; affixing each to a carrier; and then cleaning each individual die. Each die thus requires re-collecting into a carrier for subsequent presentation into the test equipment. The test equipment must handle small individual dice and their movement into and out of their test positions, including precision alignment centered on, and perpendicular to, the incident light source.

One major problem with this approach is the need to sort and position each individual die for testing. This process consumes resources including test time and extra equipment. The exposure of the individual dice to this extra handling may also affect the integrity of the dice; there is more likelihood of chipping and scratching (which decreases overall yield).

The process of individual alignment may also lead to testing inaccuracies and/or inconsistencies. There is no sure way to guarantee a consistent test position among individual die since they are individually positioned. Moreover, the small size of each die leads to positioning inaccuracies, especially when aligning the die surface to be perpendicular to the test source. Handling individual die is unproductive as it forces the use of sophisticated machine vision systems, and additional motions, to locate the position of each die, thereby adding considerable cost and complexity, and reducing test throughput.

What is required, therefore, is a technique for fabrication, handling and test of optical devices such as TFFs, which improves process throughput, yield, and test accuracy.

SUMMARY OF THE INVENTION

These requirements are met, and further advantages are provided, by the present invention which in one aspect is a technique for fabricating a plurality of thin film filters ("TFFs") from a wafer. The technique includes affixing the wafer to a carrier having a pattern of notches formed thereon corresponding to a pattern into which the wafer is to be diced to form the TFFs. The notches are sized to allow clearance of a dicing apparatus used during dicing.

The wafer is diced at least partially into the notches to form the TFFs, and the TFFs may be individually optically tested with a light source aligned thereto, while they remain affixed to the carrier. The testing includes aligning each TFF to the light source, including moving the carrier relative to the light source, using alignment features pre-placed on the carrier. The carrier is formed from an optically transmissive material, and the optical test includes transmitting light from the light source through the carrier, and in a direction perpendicular to the carrier and filter layers of the TFFs.

Subsequent to testing, the TFFs are removed from the carrier for operation, and the carrier can be re-used for fabricating TFFs from another wafer. To facilitate re-use, a releasable adhesive is applied to the wafer and/or the carrier, and the notches advantageously receive any excess adhesive when the wafer is being affixed to the carrier.

In another aspect, the present invention relates to a carrier for processing a wafer from which a plurality of thin film filters ("TFFs") is to be diced. As discussed above, the carrier includes a planar surface having a pattern of notches corresponding to a pattern into which the wafer is to be diced to form the TFFs. The invention extends to the carrier in combination with the wafer from which the TFFs are to be diced. The carrier is attached to the wafer with a releasable adhesive, and excess adhesive may be present in at least some of the notches. The invention extends to the further combination of the carrier/wafer with a dicing apparatus, the dicing apparatus adapted to use alignment features of the carrier to align to, and dice, the TFFs from the wafer at least partially into the notches.

In yet another aspect, the present invention relates to a carrier in combination with the plurality of diced TFFs, affixed to respective portions of the carrier between the notches with a releasable adhesive. The invention extends to the further combination of the carrier/TFFs with a test apparatus, the test apparatus adapted to use alignment features of the carrier to respectively align to, and optically test, individual ones of the TFFs.

The present invention is also applicable to a range of other optical devices requiring alignment while dicing from a wafer, and a subsequent alignment during optical test.

By using the same carrier during dicing and testing, sub-micron accuracy can be attained when positioning the diced TFFs during optical test. Moreover, the steps of TFF re-mount into individual test carriers, and alignment of each carrier, are eliminated. The present invention therefore greatly increases test accuracy and throughput, and decreases overall processing costs.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may be best understood by reference to the following detailed description of the preferred embodiment(s) and the accompanying drawings in which:

BEST MODE FOR CARRYING OUT THE INVENTION

Those skilled in the art should note that the drawings in this application depict certain aspects of the present invention, and are not necessarily drawn to scale.

Figure 1:
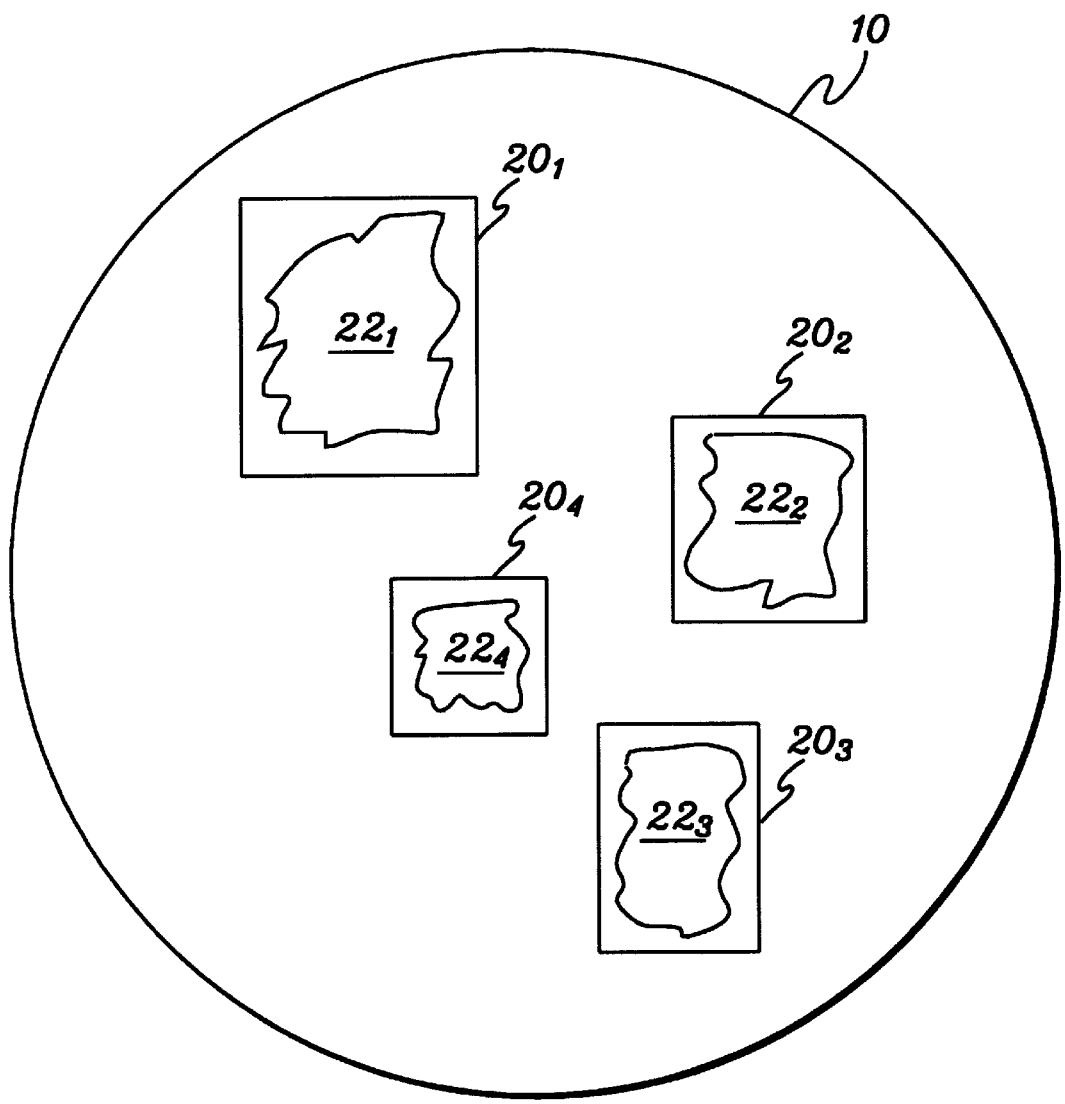
FIG. 1 depicts wafer areas identified as having a reasonable probability of yielding quality thin film filters ("TFFs")

As discussed above, thin film filters ("TFFs") are formed using wafer-based processing in which many filter layers are deposited onto a substrate. FIG. 1 shows wafer 10 following filter layer deposition. Using known examination techniques, areas $22_1 \ldots 22_4$ of wafer 10 can be identified as having good probability of yielding quality filters. Rectangular filter areas or "coupons" $20_1 \ldots 20_4$ can be removed (e.g., diced) from the wafer enclosing these promising areas. The terms "wafer" and "coupon" are used broadly and interchangeably herein and connote the whole of, or any portion of, a processed element from which TFFs will be derived.

Figure 2:
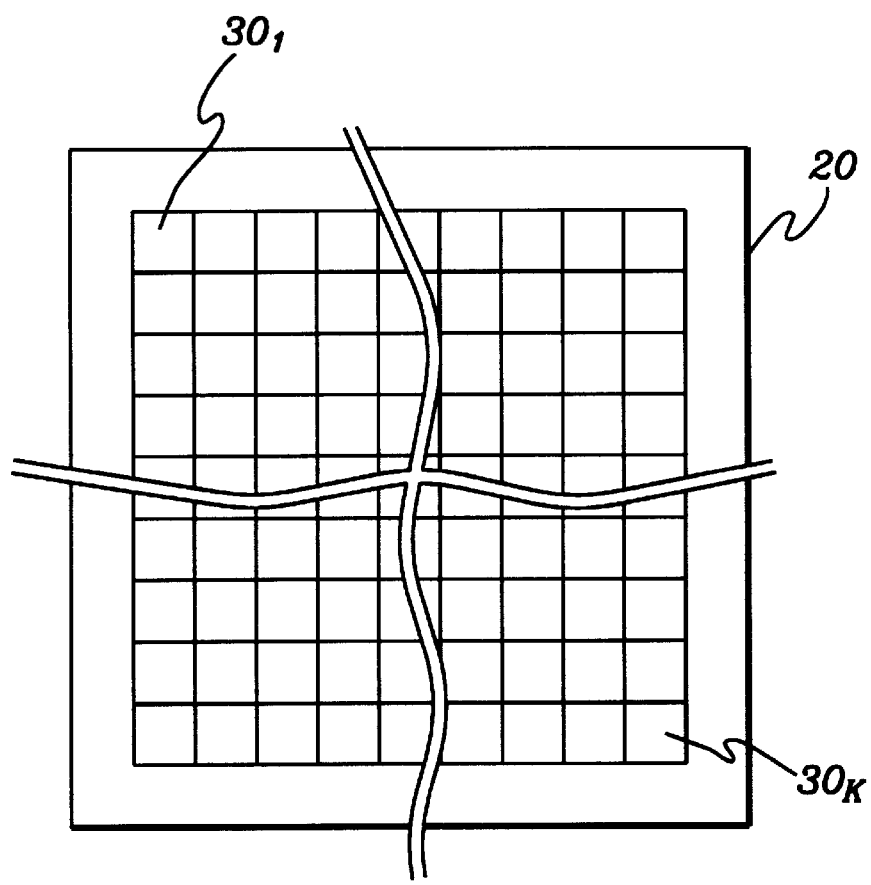
FIG. 2 depicts a sectioned "coupon" cut from the wafer of FIG. 1, with an exemplary TFF layout superimposed thereon.
Figure 3:
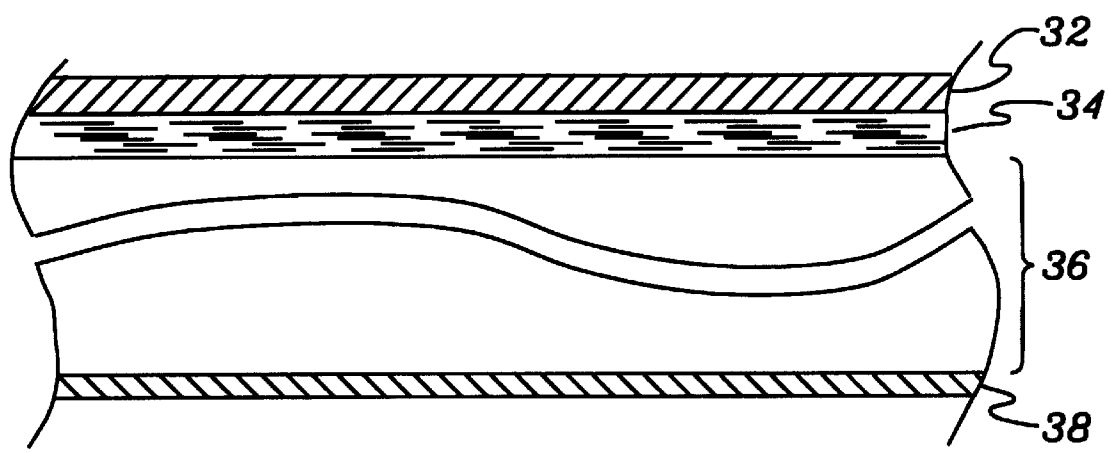
FIG. 3 is a cross-section of the coupon of FIG. 2 illustrating an exemplary layered composition of a TFF wafer.

FIG. 2 shows four sectioned portions of a single coupon 20 having multiple, possibly thousands, of individual TFF areas $30_1 \ldots 30_k$ superimposed for illustrative purposes, prior to their dicing from the coupon. Each TFF may have a dimension on the order of 1–2 mm on a side. The cross-section of FIG. 3 shows one exemplary composition of the coupon at this stage of processing. Filter layers 34 (e.g., about 60 $\mu$m thick total) have been deposited over substrate 36 (e.g., quartz, about 1 mm thick). The coupon may also be top and bottom coated with anti-reflective ("AR") coatings 32 and 38 (e.g., $TA_3O_5+SiO_2$)

Figure 4A:
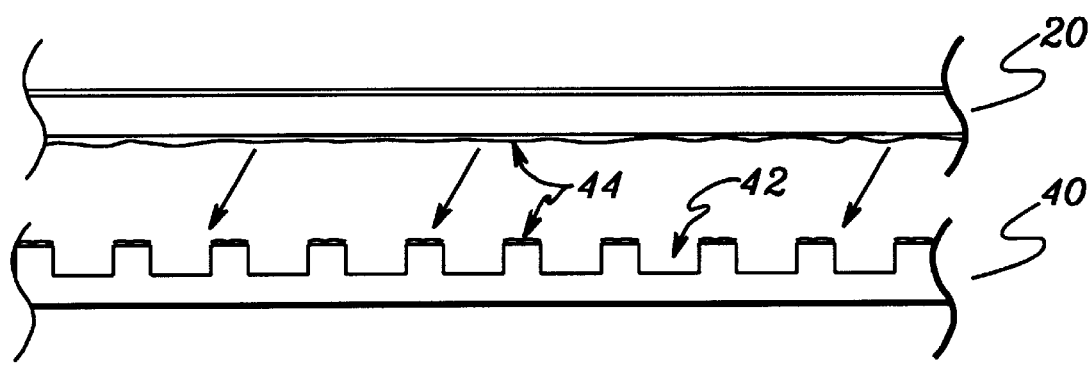
FIGS. 4a–c depict cross-sections of the coupon and a carrier during certain steps of the present invention, including affixing the coupon onto the pre-scribed carrier, and dicing the coupon while affixed to the carrier.
Figure 4B:
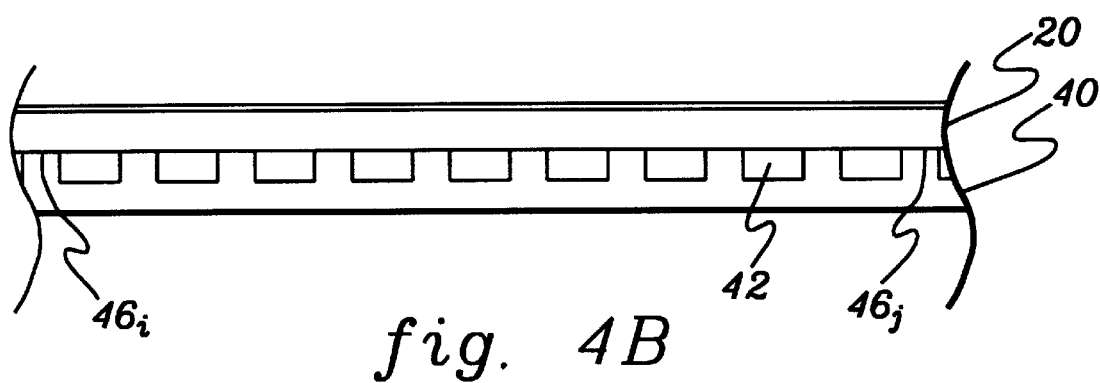
Figure 4C:
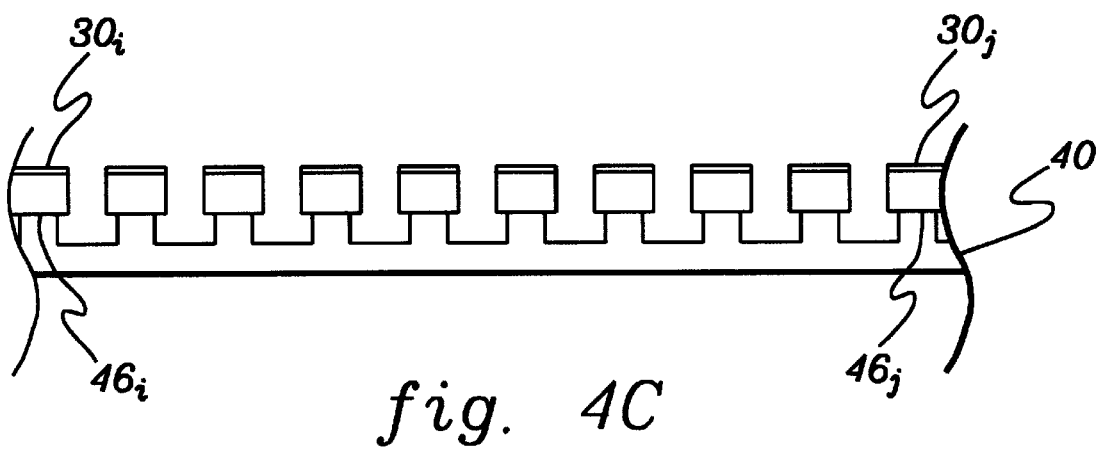

In accordance with the present invention, and with reference to the cross-sections of FIGS. 4a–c, coupon 20 is affixed to a reusable pre-cut or pre-scribed carrier 40 to facilitate TFF dicing and testing. Carrier 40 has been pre-scribed with an arrayed, rectangular pattern of notches (e.g., 42) corresponding to the arrayed rectangular pattern of cuts envisioned for dicing coupon 20 into its individual TFFs. Coupon 20 is affixed to carrier 40 using a releasable adhesive 44 (e.g., UV-release liquid film) applied to the bottom of coupon 20 and/or the top surfaces of carrier 40. One initial benefit of notches 42 is that when coupon 20 is affixed to carrier 40 (FIG. 4b), any excess film is squeezed into the notches, resulting in a more uniform coating of film between the surfaces without any voids or other anomalies which could impact dicing and test.

When the film cures, the finished coupon/carrier combination of FIG. 4b results. A dicing saw is used to cut through coupon 20 along the same pattern established by the notches to create the individual TFFs e.g., $30_i \ldots 30_j$ (FIG. 4c). Each TFF remains affixed to its respective "platform" $46_i \ldots 46_j$, for subsequent testing as discussed further below. The terms "dicing" and "dicing apparatus" are used broadly herein to connote any type of operation and tool used to sever portions of a wafer, of which a dicing saw is one example.

Figure 5:
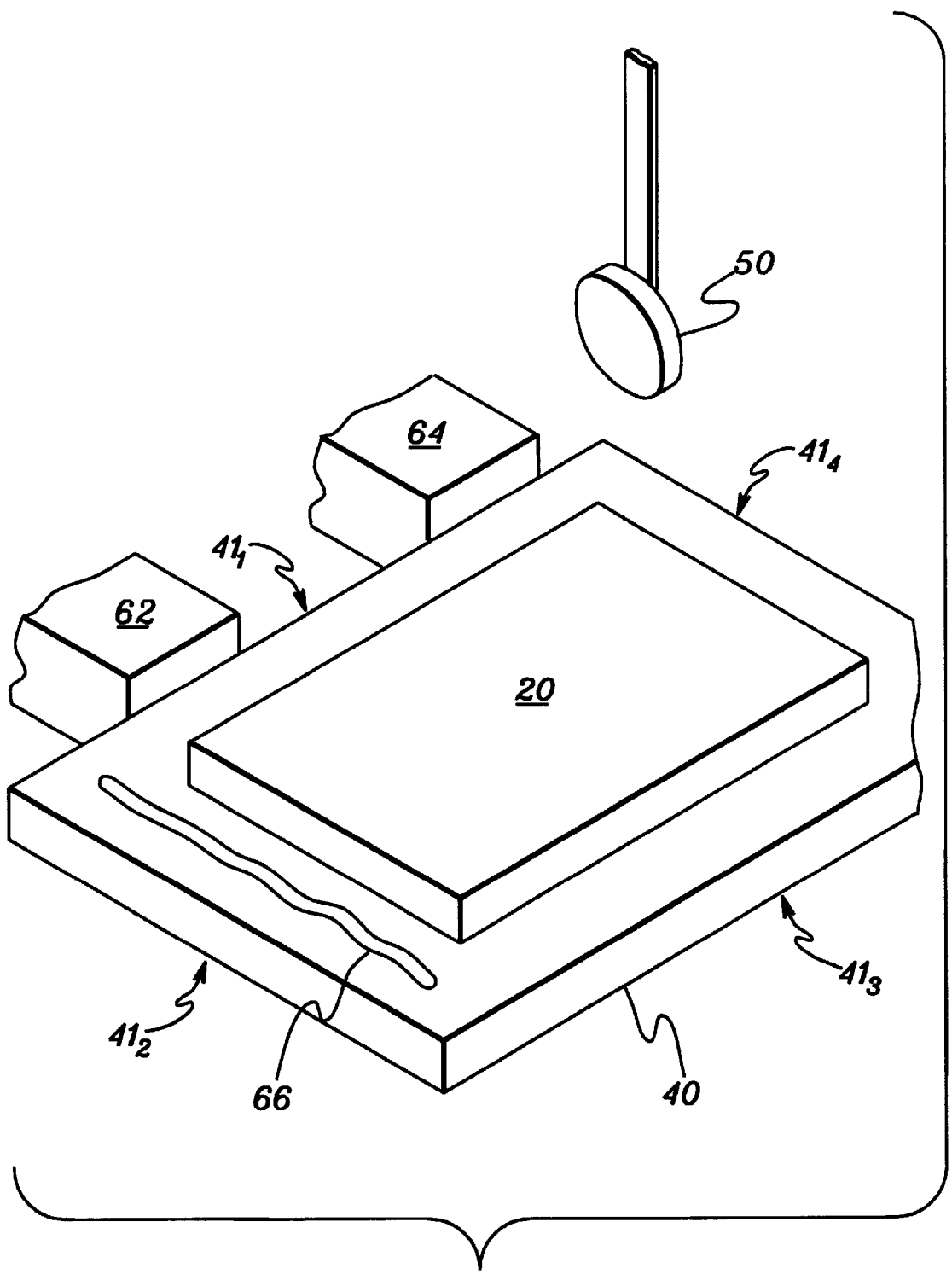
FIG. 5 depicts an exemplary technique for positioning and aligning the coupon/carrier assembly during dicing.
Figure 6:
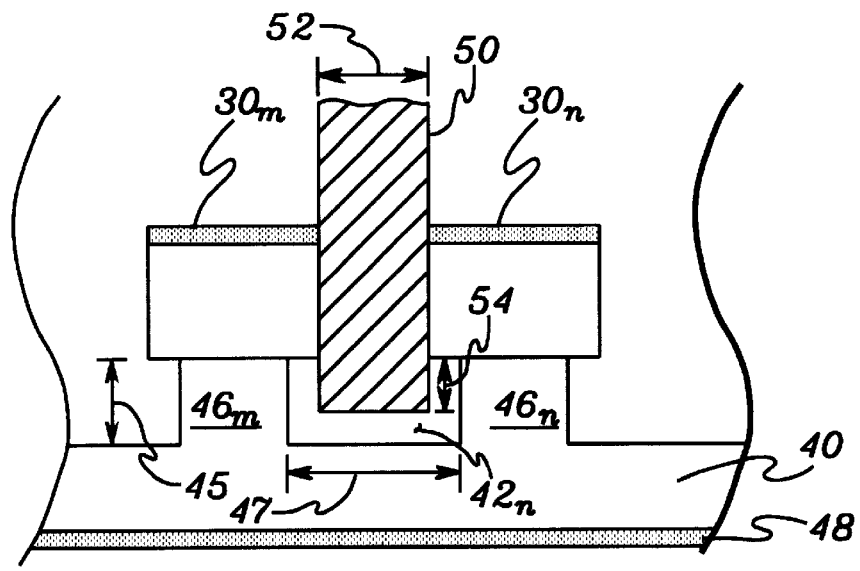
FIG. 6 is an enlarged, cross-sectional view of two adjacent TFFs during dicing, including the corresponding notched portion of the underlying carrier.

FIGS. 5–6 illustrate further details and benefits of the dicing process of the present invention. In the perspective view of FIG. 5, coupon 20 is affixed to carrier 40 prior to dicing (i.e., as in FIG. 4b). As discussed above, carrier 40 includes the notches in the same arrayed, rectangular pattern into which the TFFs will be cut (not shown here). These notches are scribed in precise positions relative to other "alignment features" of the carrier to facilitate its precise movement relative to a dicing apparatus (e.g., saw 50) during dicing. In this example, these alignment features are simply the carrier edges $41_1 \ldots 41_4$. The dicing apparatus may include positioning apparatus (e.g., arms 62, 64) placed against any/all of these edges to hold and/or move the carrier (and coupon) relative to dicing saw 50. Various other alignment indicia can be employed without departing from the scope of the invention. For example, the carrier can be moved relative to the saw or the saw can be moved relative to the carrier according to these features. Rather than, or in addition to the edge features, other alignment features can be pre-placed onto carrier 40 such as visual alignment features 66 in visible areas. Precision visual alignment techniques can then be used for the movement relative to the saw. The term "alignment features" is used broadly herein to connote any feature of carrier 40 aligned to the pre-scribed notch pattern which aids in the alignment of the notch pattern, to dicing or test apparatus. The same type of alignment described above for dicing can be used for test, discussed further below. The term "relative to" when used with terms like "movement" and "alignment" is used broadly herein to connote any relative movement between structures. Either structure can be moved separately, or they can both be moved, to attain the desired relative positioning.

Details of the carrier structure and dicing strategy are shown in the enlarged, cross-sectional view of FIG. 6. A section between two adjacent TFFs $30_m$ and $30_n$ is being cut here by saw 50. Notch $42_n$ is sized to allow saw clearance along its walls and floor, allowing a cleaner cut of the TFF. This clearance must be large enough to allow blade clearance, but also small enough to ensure structural integrity of the surrounding platforms $46_m$ and $46_n$. The platform and notch sizes are necessarily constrained by the size of the TFFs, therefore, there are limits on the ability to independently size these structures. In general, the notch should have a width 47 slightly larger than the width 52 of blade 50, and a depth 45 slightly greater than the anticipated penetration depth 54 of blade 50. Though the cross-section of FIG. 6 shows these dimensions along only one dimension, the same principles apply along all four sides of the TFF.

Also shown in FIG. 6 is an additional AR layer 48 on the bottom of carrier 40, which may be used as necessary for, e.g., structural integrity, protection, etc. Since the TFFs will remain affixed to the carrier during optical test, the carrier is preferably formed from a highly transmissive glass (e.g., quartz) to ensure that it does not adversely impact optical test. One advantage of the glass carrier method is that the carrier can provide a temporary AR coating for devices which do not require AR coating in their final use. (It should be noted that AR coating 32 discussed above can also be a temporary "plate" removed subsequent to test.) The temporary AR coating(s) allow the spectral analysis to be done in free-space, for devices which may not require AR coating(s) in their final application. One application in which a non-AR coated TFF may be used is when many TFFs are epoxied together or a TFF is epoxied onto another optical device in a glue path assembly. In this case, an AR coating would interfere with the TFF's functionality. For these types of devices, it is desirable to test with temporary AR coating(s) for free-space spectral analysis, and later remove the temporary AR coating(s) for final use (e.g., in a glue path assembly).

Figure 7:
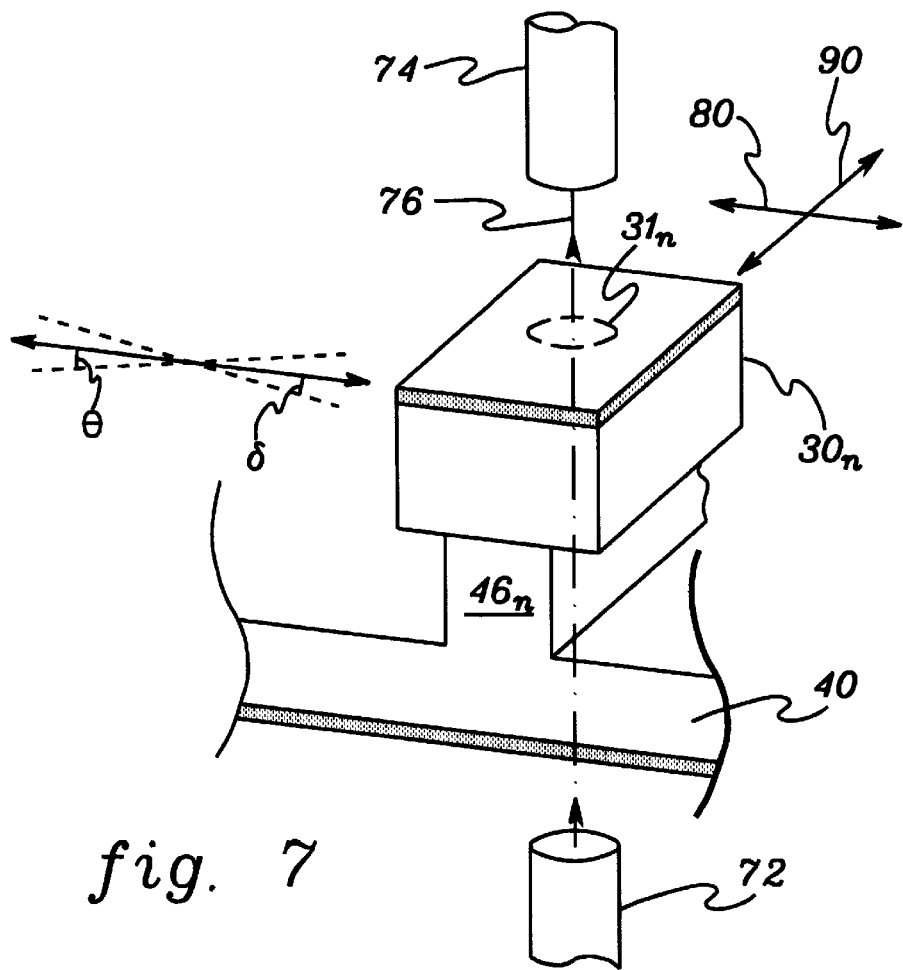
FIG. 7 is a perspective view (partially in cross-section) of a single TFF under optical test while affixed to the underlying carrier.
Figure 8:
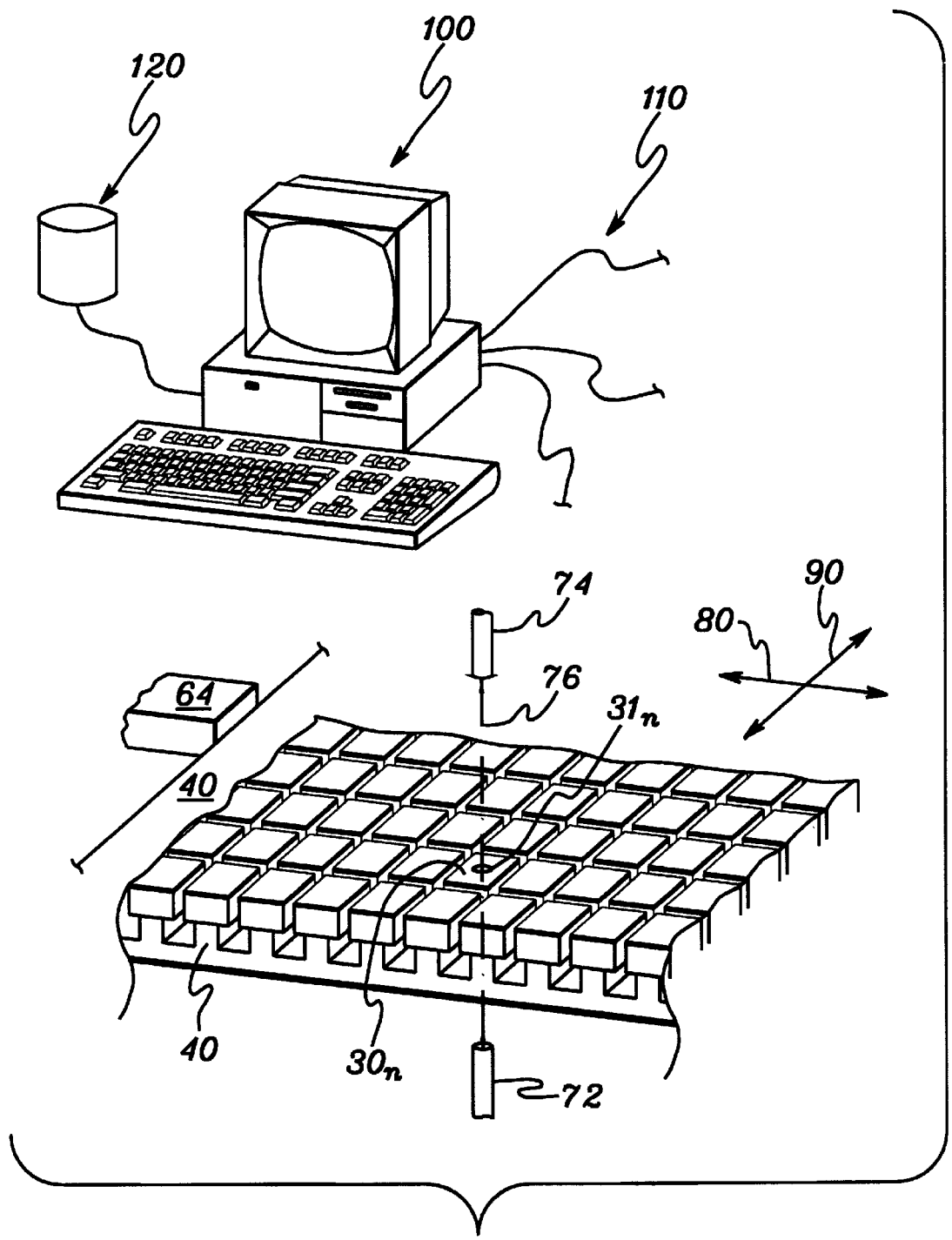
FIG. 8 is a perspective view (partially in cross-section) of many TFFs of the coupon to be moved in and out of their test positions.

Following TFF dicing over the entire coupon, each individual TFF rests on a respective platform of the carrier, as shown in FIGS. 7–8. In accordance with the present invention, the individual TFFs remain in this position for testing. Each TFF retains its position relative to all other dice with extremely high precision as defined during the dicing step. Their prior dicing relieves any structural stresses between adjacent TFFs (i.e., the TFFs should be tested in their diced form to ensure optical performance and test integrity). However, maintaining their mounted position leads to sorting and alignment benefits as discussed below.

As shown in FIG. 7, TFF $30_n$ rests on platform $46_n$ of carrier 40. Light source 72 and detector 74 (in mutual alignment) are used to test the spectral (and therefore filter) properties of the TFF. However, as discussed above, it is critical that this testing be performed with precise alignment between the TFF and the light source/detector. Therefore, the light axis 76 must be precisely aligned around the center $31_n$ of the TFF under test. This precise alignment is effected by moving the entire carrier relative to the source/detector along directional axes 80 and 90. By keeping all TFFs attached to the carrier during testing, discrete movement steps can be made between TFFs, without the time and effort required to dismount and remount each individual TFF. Moreover, by using the built-in alignment features of the carrier discussed above (e.g., its edges and/or pre-scribed visual indicia, etc.), these movements and alignment can be made with much more precision. Sub-micron positioning is possible since wafer-based alignment techniques can be used.

It is also necessary to keep the individual TFFs "flat" or perpendicular to the light axis 76. Tilt in any direction (i.e., over angles $\theta, \delta$) will negatively impact testing. This angular alignment is also readily addressed by the present invention. The TFFs remain mounted in a parallel relationship to the underlying carrier, which itself remains flat in any test fixture. The tilt of any individual TFF is therefore minimized or non-existent, which is not the case if the TFF required re-mounting in a separate fixture.

FIG. 8 illustrates these principles of the present invention using a perspective, partially sectioned view of the carrier 40 to which the individual TFFs remain attached during test. As discussed above, the carrier 40 can be moved with a positioning device 64 to place each individual TFF (e.g., here $30_n$) into a properly aligned test position relative to the light axis 76 between source 72 and detector 74. Other positioning techniques are possible, without departing from the scope of the invention (moving the source/detector; using visual positioning, etc.). Regardless of the type of positioning technique used, none of the TFFs require removal before test; they all retain their highly-aligned positions on the carrier, thus improving test time and quality. Following test, the TFFs are removed from the carrier and cleaned. Depending on test results, they may require subsequent sorting based on position, however, this sorting step is much less demanding than the pre-test sort and positioning of conventional techniques.

Following removal of the TFFS, the carrier can also be cleaned, and then re-used for subsequent TFF coupon dicing and testing.

The entire test process can be controlled and/or monitored using appropriate computer equipment such as processor 100, connected to the test equipment with connections 110. Test equipment typically includes a swept wavelength optical spectral analyzer. All software necessary to run the tests can reside on any type of storage media, e.g., 120.

Using the same carrier during dicing and testing allows sub-micron accuracy to be attained when positioning the diced TFFs during optical test. Moreover, the steps of TFF re-mount into individual test carriers, and alignment of each carrier, are eliminated. The present invention therefore greatly increases test accuracy and throughput, and decreases overall processing costs.

While the invention has been particularly shown and described with reference to preferred embodiment(s) thereof, it will be understood by those skilled in the art that various changes in form and details may be made therein without departing from the spirit and scope of the invention.

What is claimed is:

1. A carrier for processing a wafer from which a plurality of thin film filters ("TFFs") is to be diced, comprising:
    a planar surface having a pattern of notches formed thereon, said pattern corresponding to a pattern into which the wafer is to be diced to form the plurality of TFFs.

2. The carrier of claim 1, wherein the notches are sized to allow clearance of a dicing apparatus to be used to dice the wafer into the TFFs.

3. The carrier of claim 1, formed from an optically transmissive material, such that a light source can be directed through the carrier, and in a direction perpendicular to the planar surface of the carrier and filter layers of the TFFs, to test the TFFs.

4. The carrier of claim 1, in combination with the wafer from which the plurality of TFFs is to be diced, the carrier attached to the wafer with a releasable adhesive.

5. The combination of claim 4, wherein excess adhesive is present in at least some of the notches.

6. The combination of claim 4, in further combination with a dicing apparatus, the dicing apparatus adapted to use alignment features of the carrier to align to, and dice, the TFFs from the wafer, at least partially into the notches.

7. The carrier of claim 1, in combination with the plurality of diced TFFs, affixed to respective portions of the carrier between the notches with a releasable adhesive.

8. The combination of claim 7, in further combination with a test apparatus, the test apparatus adapted to use alignment features of the carrier to respectively align to, and test, individual ones of the TFFs with a light source directed through the carrier, and in a direction perpendicular to the planar surface of said carrier and filter layers of the ones of the TFFS.

* * * * *